United States Patent
Joyner

Patent Number: 6,014,390
Date of Patent: Jan. 11, 2000

[54] TUNABLE TRANSMITTER WITH MACH-ZEHNDER MODULATOR

[75] Inventor: Charles H. Joyner, Red Bank, N.J.

[73] Assignee: Lucent Technologies Inc., Murray Hill, N.J.

[21] Appl. No.: 09/016,176

[22] Filed: Jan. 30, 1998

[51] Int. Cl.[7] ..................................................... H01S 3/10
[52] U.S. Cl. .................... 372/20; 372/6; 372/92; 372/26; 372/64; 372/50; 372/102
[58] Field of Search .................... 372/6, 92, 50, 372/21, 22, 26, 102, 20, 28, 64; 385/37, 46, 24

[56] References Cited

U.S. PATENT DOCUMENTS

| | | | |
|---|---|---|---|
| 5,002,350 | 3/1991 | Dragone . | |
| 5,136,671 | 8/1992 | Dragone ..................................... | 385/46 |
| 5,155,620 | 10/1992 | Gordon et al. ............................. | 372/21 |
| 5,339,157 | 8/1994 | Glance et al. . | |
| 5,396,507 | 3/1995 | Kaminow et al. ......................... | 372/67 |
| 5,412,744 | 5/1995 | Dragone ..................................... | 385/24 |
| 5,502,781 | 3/1996 | Li et al. . | |
| 5,524,014 | 6/1996 | Kaminow et al. ......................... | 372/28 |
| 5,623,571 | 4/1997 | Chou et al. . | |
| 5,706,375 | 1/1998 | Mihailov et al. .......................... | 385/37 |
| 5,881,199 | 3/1999 | Li .............................................. | 385/24 |

*Primary Examiner*—Leon Scott, Jr.

[57] ABSTRACT

An improved wavelength tunable transmitter comprises a waveguide grating router coupled to a truncated Mach-Zehnder interferometric modulator. Light from the second order Brillouin zones of a waveguide grating router having substantially the same phase are captured and coupled to first and second transmission paths comprising the truncated Mach-Zehnder interferometer, the transmission paths then being altered relative to each other and recombined to produce a modulated output signal. With this configuration, a compact tunable transmitter is provided exhibiting bandwidth and chirp control features comparable with those of a traditional Mach-Zehnder interferometer.

14 Claims, 4 Drawing Sheets

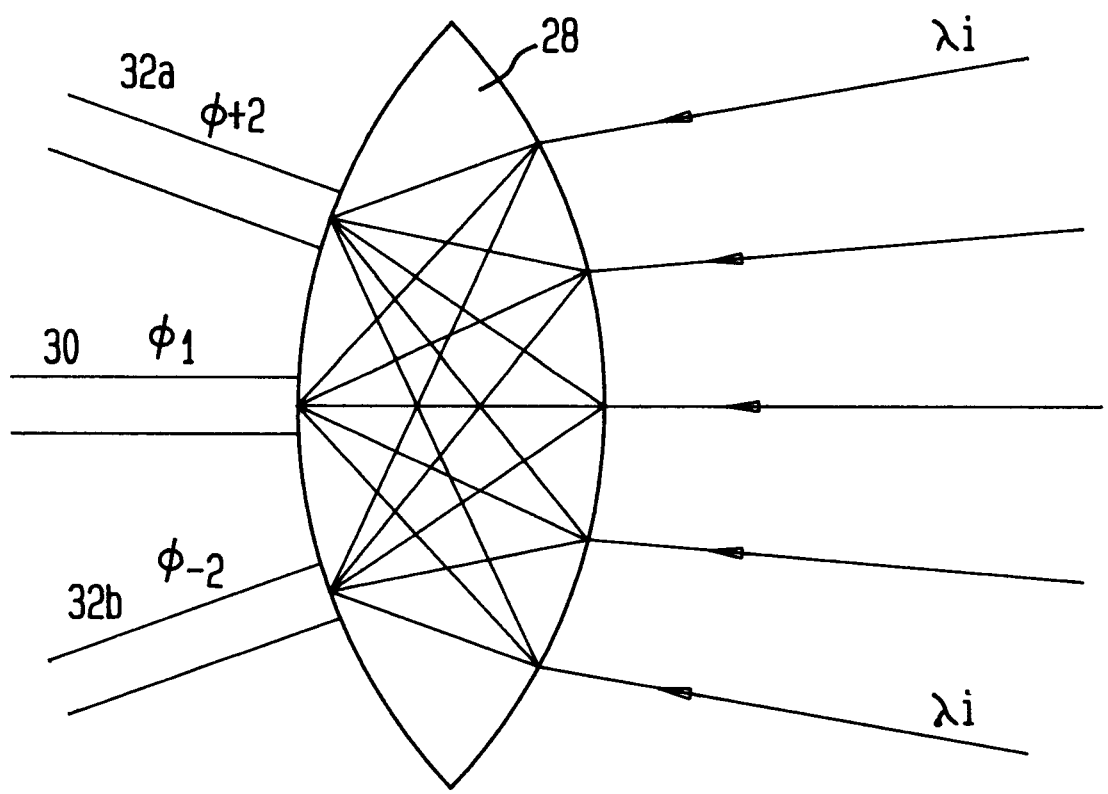

TUNABLE TRANSMITTER WITH MACH-ZEHNDER MODULATOR

FIELD OF THE INVENTION

The present invention relates to an improved wavelength tunable transmitter and in particular, a transmitter comprising a waveguide grating router coupled to a truncated Mach-Zehnder interferometric modulator, as well as an improved method of modulation.

BACKGROUND OF THE INVENTION

Multifrequency lasers are receiving increasing attention in lightwave communication systems. Multiplexing several channels with different wavelengths into a single fiber increases the capacity of a fiber transmission line and enables wavelength-dependent add-drop functions with little or no signal regeneration. It is highly desired to provide a transmitter capable of generating a number of wavelengths that can be modulated at high speed, as this not only improves flexibility of the system but also decreases the cost of maintenance.

Wavelength tunable transmitters often employ electroabsorption modulators to modulate wavelengths applying an absorption band edge. Such a system is described, for example, in C. H. Joyner (the inventor herein), M. Zirngibl, and J. C. Centanni, "An 8-Channel Digitally Tunable Transmitter with Electroabsorption Modulated Output by Selective-Area Epitaxy," IEEE Photonics Technology Letters, Vol. 7, No. 9 (September 1995), at 1013–1015, which is hereby incorporated by reference. These modulators exhibit high speed performance and good extinction at selected wavelengths. However, with use of electroabsorption, the depth of modulation is dependent on wavelength and there is little control over chirp associated with modulation. Channel spacings of 100 GHz for a sixteen channel source and single modulator are not attainable, for example, with electroabsorption modulators, because the voltage needed to achieve this level of performance would be prohibitively high or the extinction levels too low at outer channels.

Another approach for providing a wavelength tunable transmitter besides electroabsorption involves use of a Mach-Zehnder interferometric modulator, which employs phase rotation. In this way, the modulation is not dependent on wavelength and further, the chirp of the output pulse may be tailored and even made negative, which may in some cases be desired for long distance transmission applications.

To illustrate, FIG. 1A shows a typical Mach-Zehnder interferometer 10 requiring use of a beam splitter or coupler 12 for dividing the laser beam $U_0$ into two paths ($U_1$ and $U_2$), that are launched into two fibers 14a, 14b. The phase or intensity of the paths ($U_1$ and $U_2$) are altered relative to each other which may be accomplished by use of real path length differences or index path differences. FIG. 1A invokes real path length differences in that the length of fiber 14b exceeds that of fiber 14a. FIG. 1B invokes index path differences in that in FIG. 1B, a patch 16 is disposed along the transmission path of $U_2$ having a refractive index different from that of the substrate or wafer 20; an electric field applied across the patch 16 induces a change in the phase of the signal $U_2$ relative to $U_1$. In either case, two different signals $U_1$ and $U_2$ are generated which are recombined with a second beam splitter or coupler 22, preferably with low loss. The superposition of the two waves causes destructive or constructive interference necessary to produce output signal U, a modulated signal relative to input $U_0$.

While the Mach-Zehnder interferometric modulator can be used to provide a tunable transmitter with good extinction over a broad range of wavelengths, it consumes a relatively large amount of chip space. Thus, it would be advantageous to have a wavelength tunable transmitter providing the bandwidth and chirp control features of the Mach-Zehnder interferometric modulator in a lesser amount of space. The invention provides these advantages, and it also provides the advantage of capturing light in the second order Brillouin zones of a waveguide router which in prior applications have been considered unwanted and discarded. Further advantages may appear more fully upon consideration of the description given below.

SUMMARY OF THE INVENTION

Summarily described, the invention embraces an improved wavelength tunable transmitter comprising a waveguide grating router coupled to a truncated Mach-Zehnder interferometric modulator. The waveguide grating router has grating arms radiating into first and second waveguide outputs in the second order Brillouin zones, the waveguide outputs having substantially the same phase. Applying a truncated Mach-Zehnder interferometric modulator, the two waveguide outputs from the second order zones are captured, altered relative to each other, and recombined to produce a final modulated output signal having a selected wavelength. With this configuration, the CW (continuous wave) wavelength of the laser can be selectively tuned by altering the temperature of the device or by selection of an appropriate amplifier driver. The modulated signal results from power tapped at the main laser cavity. The result is a compact device consuming approximately one-half the space of a traditional Mach-Zehnder interferometer. Preferably, the components of the tunable transmitter are monolithically integrated on a semiconductor wafer.

BRIEF DESCRIPTION OF THE DRAWINGS

For a better understanding of the invention, an exemplary embodiment is described below, considered together with the accompanying drawings, in which:

FIG. 2 is an exploded schematic view of a free space region of a waveguide router demonstrating the generation of first and second order Brillouin zones;

It is to be understood that these drawings are for the purposes of illustrating the concepts of the invention and are not to scale.

DETAILED DESCRIPTION OF THE INVENTION

Applicant has discovered that light in the second order Brillouin zones of a waveguide grating router can be used to produce a compact tunable transmitter device exhibiting high speed performance with use of a truncated Mach-Zehnder modulator. To illustrate the principles of the invention, reference is made to FIG. 2, which shows an exploded schematic view of one of the two free space regions of a waveguide router. Waveguide routers are known in the field for use in optical devices and communications systems and are described, for example, in U.S. Pat. No. 5,339,157 issued Aug. 16, 1994 to Glance et al., entitled "*Rapidly Tunable Integrated Optical Filter*," and U.S. Pat. No. 5,623,571 issued Apr. 22, 1997 to Chou, Joyner (the inventor herein), et al., entitled "*Polarization Compensated Waveguide Grating Router*," assigned to Lucent Technologies, Inc., the assignee herein, both of which are incorporated by reference.

Referring to FIG. 2, light signals are received in free space region 28 as an incident plane wave of light having wavelength $\lambda_i$. The plane wave will be split by free space region 28 into first order (30) and second order (32a, 32b) modes or Brillouin zones, having the same wavelength $\lambda_i$ but different phases; the phase in the first order zone ($\phi_1$) will differ slightly from the phase in the second order zones ($\phi_{2+}$ and $\phi_{2-}$). In any case, typically the waveguide outputs in the second order zones have been considered unwanted as creating noise and discarded with use of dummy waveguides. This would reflect an undesirable loss in the system.

Figure 1A:
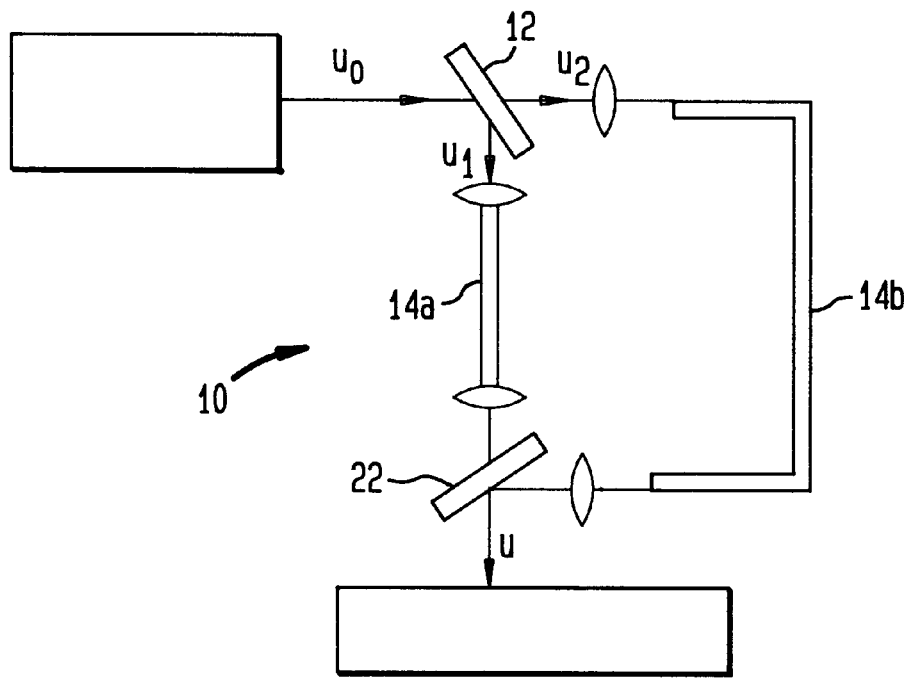
FIG. 1A is a schematic diagram of a traditional Mach-Zehnder interferometer.
Figure 1B:
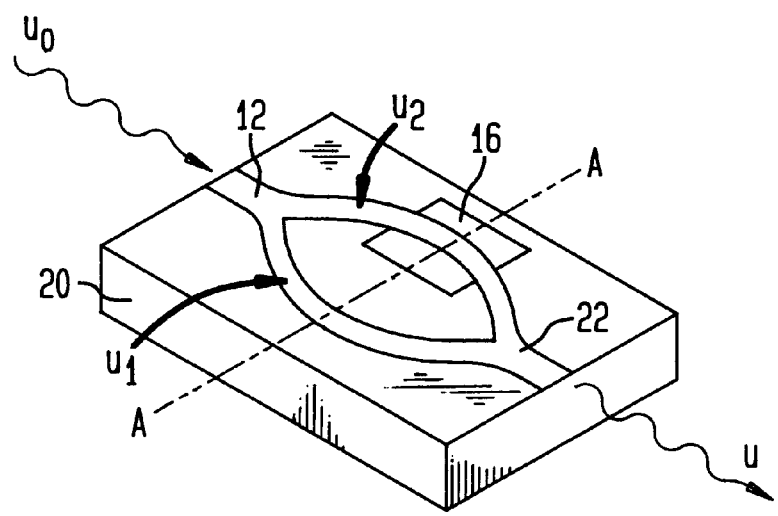
FIG. 1B is a perspective view of a Mach-Zehnder interferometer on a substrate.

With this invention, waveguide outputs in the second order Brillouin zones of a waveguide router are used to produce two waveguide outputs that are captured and coupled to a truncated Mach-Zehnder interferometer. With the waveguide router, two outputs having substantially the same phase 42 are produced in a compact way. A Mach-Zehnder interferometer is truncated following the line A—A of FIG. 1B, thus substantially reducing the space consumed by the modulator.

Figure 3A:
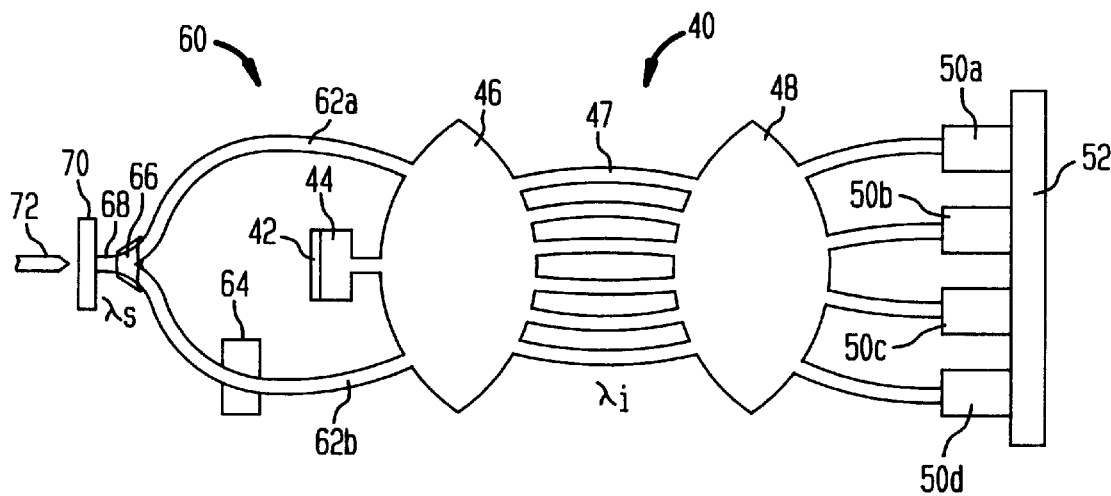
FIG. 3A is a schematic diagram of one embodiment of the inventive tunable transmitter.

Referring to FIG. 3A, there is shown a schematic diagram of one embodiment of the inventive tunable transmitter which comprises a waveguide router 40 coupled to a truncated Mach-Zehnder interferometer 60. The waveguide router 40 comprises two free space regions 46, 48, connected by grating arms 47. An RIE etched mirror on the left side of the diagram is followed by a single or common amplifier 44. Light leaving the common amplifier 44 crosses free space region 46 to fill grating arms 47 connecting the two free-space regions. The grating arms 47 comprise a plurality of waveguides differing in length, with a constant path length between adjacent arms. This length difference translates into a wavelength-dependent phase difference. A series of tuning amplifiers 50a, 50b, 50c, 50d, on the right side of the diagram followed by a highly-reflective facet 52 may be activated to cause the generation of a signal across grating arms 47 having a particular initial wavelength $\lambda_i$. Further details regarding operation of the waveguide router are disclosed in the above-referenced U.S. patents incorporated herein by reference and need not be repeated at length here.

Figure 3B:
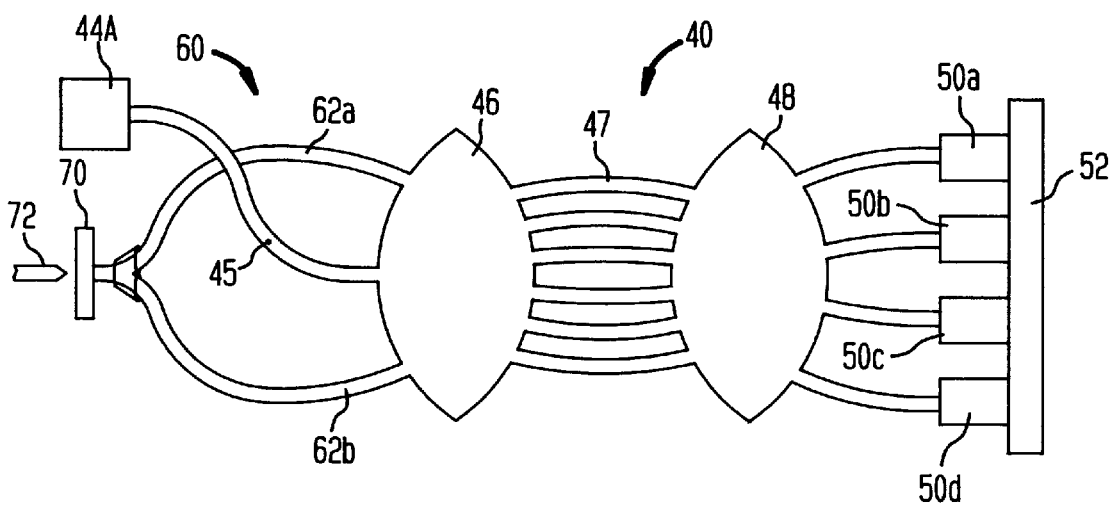
FIG. 3B is a schematic diagram of an alternative embodiment of the inventive tunable transmitter.

In operation, light emerging from free space region 46 radiates into grating arms comprising first and second order grating zones. Light in the first order grating mode is always aligned with common amplifier 44. While in past designs light in the second order grating zones was discarded and represented an unwanted loss, with the inventive transmitter these outputs are captured and coupled to first and second transmission paths 62a, 62b, of the truncated Mach-Zehnder interferometer 60. The two outputs of the second order grating zones, which have substantially the same phase $\phi_2$, comprise the first and second transmission paths 62a, 62b. Using the interferometer, the transmission paths 62a, 62b are altered relative to each other by index path or real path length differences. FIG. 3A illustrates index path differences with use of patch 64 having an index of refraction different from that of the substrate in which the interferometer is embedded (e.g., FIG. 5), and current or voltage is injected to alter the phase. The signals are recombined by coupler 66 to produce output 68 having a selected wavelength $\lambda_s$. The output port 68 is terminated on a facet having an anti-reflective coating 70 which is advantageous for efficiently coupling the signal into a fiber 72 and for minimizing reflections back into the transmitter. FIG. 3B illustrates an alternative embodiment of the inventive transmitter involving a crosswaveguide 45 coupled to amplifier 44A.

With this configuration, the CW wavelength of the laser can be selectively tuned by altering the temperature of the device or by selecting the appropriate amplifier driver (e.g., 50a, 50b, 50c, 50d). The modulated signal results from power tapped from the main laser cavity which is too long to be modulated directly at high speed. Consequently, the bandwidth and chirp control features of the traditional Mach-Zehnder interferometer may be achieved, and yet, the device consumes approximately one-half the chip space of the Mach-Zehnder interferometer.

Figure 4:
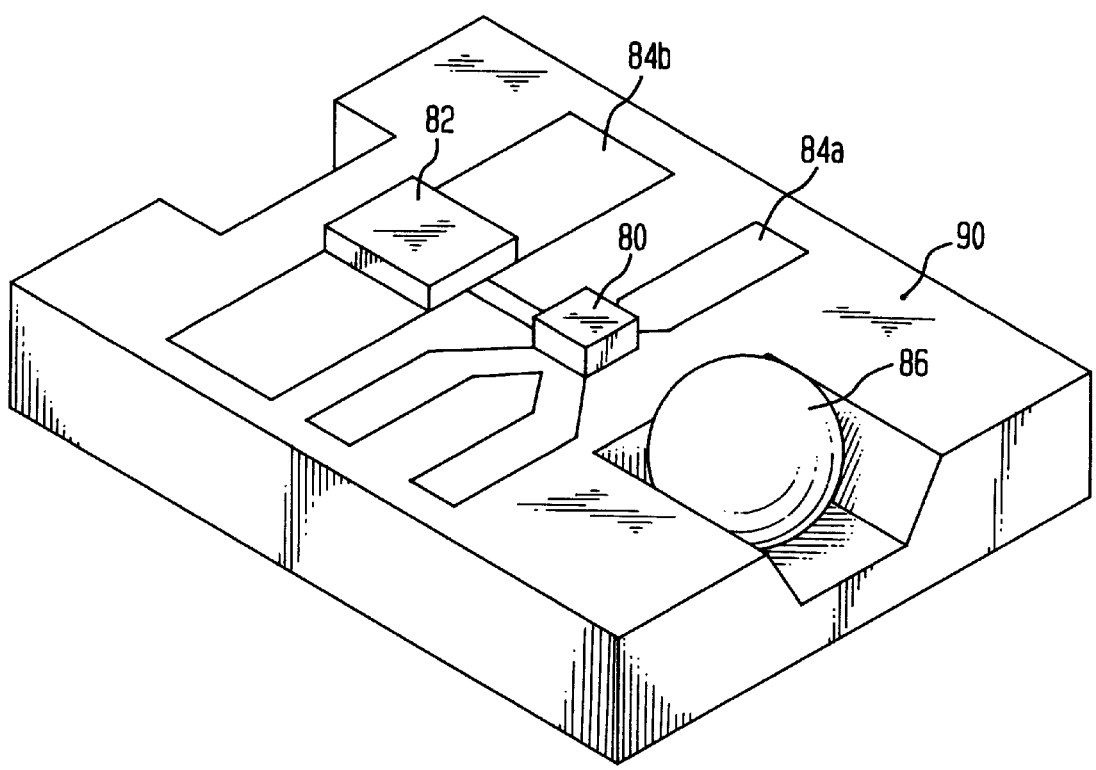
FIG. 4 is a perspective schematic view of an optical assembly comprising the inventive tunable transmitter.

It will be appreciated that the transmitter of FIGS. 3A and 3B will generally be part of an optical fiber communication system that further comprises such conventional elements as a receiver and an optical path comprising one or more fibers connecting transmitter and receiver. As schematically illustrated in FIG. 4, the inventive transmitter is advantageously monolithically integrated on one laser cavity 80 using known photolithography techniques and mounted on an optical subassembly platform 90 used to support optical devices and provide electrical connections thereto. The platform may further contain conventional elements such as a photodiode 82 for monitoring the output from the laser cavity 80; metallized regions 84a, 84b, electrically coupled to the laser cavity and photodiode for energizing the components; and lens 86 for collimating the beam of light emitted from the face of the laser cavity for use external to the suboptical assembly package.

It is understood that the embodiments described herein are merely exemplary and that a person skilled in the art may make variations and modifications without departing from the spirit and scope of the invention. All such variations and modifications are intended to be included within the scope of the appended claims.

I claim:

1. A wavelength tunable transmitter comprising:
   (a) a waveguide grating router comprising
      (i) a source of incident plane wave of light having an input wavelength $\lambda_i$ and a phase, and
      (ii) at least a first free space region configured to receive the input light from the source and generate first order and a pair of second order Brillouin zones having the same wavelength $\lambda_i$, the pair of second order Brillouin zones defining a pair of waveguide outputs having substantially the same phase, and
   (b) a truncated Mach-Zehnder interferometer comprising two incoming transmission paths for receiving the pair of outputs, a means for altering the phase of one transmission path relative to the other, and a means for combining the transmission paths to a single output having a predetermined wavelength $\lambda_i$, wherein one of each of the pair of outputs in the second order Brillouin zones is coupled to one of the transmission paths of the interferometer, whereby the second order Brillouin zones are employed as an output from the waveguide router to enable high speed modulation of the predetermined wavelength $\lambda_i$ at the single output, and wherein the source comprises a series of amplifiers so that selective activation of one of the series of amplifiers will determine the predetermined wavelength $\lambda_i$ at the single output.

2. The tunable transmitter according to claim 1, in which the waveguide router further comprises a second free space region connected to the first free space region by a plurality of unequal length grating arms.

3. The tunable transmitter according to claim 2 further comprising a single amplifier coupled to the second free space region.

4. The tunable transmitter according to claim 1, in which the truncated Mach-Zehnder interferometer comprises a substrate having the two transmission paths disposed thereon, and the means for altering the phase of one transmission path comprises a region disposed on the substrate along at least one of the transmission paths having a refractive index different from that of the substrate.

5. The tunable transmitter according to claim 1, in which the means for altering the optical properties of one transmission path comprises the transmission paths having differing lengths.

6. The tunable transmitter of claim 1 in which the waveguide grating router and the truncated Mach-Zehnder interferometer are monolithically integrated on a substrate.

7. An optical fiber communication system including the tunable transmitter of claim 6 and further comprising a receiver and at least one fiber, the at least one fiber defining an optical path connecting the transmitter and the receiver.

8. A wavelength tunable transmitter comprising:

(a) a waveguide router comprising a series of tuning amplifiers defining a source of input light$_i$, a first free space region for receiving light from the source, a second free space region, and a plurality of waveguide grating arms connecting the first and second free space regions, wherein selective activation of at least one of the series of amplifiers will determine the wavelength $\lambda_i$ of the input light;

wherein the first and the second free space regions generate first order and a pair of second order Brillouin zones having the same wavelength $\lambda_i$ the pair of second order Brillouin zones being transmitted over the plurality of grating arms between the first and second free space regions, and the second free space region of the waveguide router emitting a pair of waveguide outputs in the second order Brillouin zones, the pair of outputs modes defining a first waveguide output and a second waveguide output having substantially the same phase, (b) a truncated Mach-Zehnder interferometer comprising two incoming transmission paths for receiving the first and second waveguide outputs, a means for altering the phase of one transmission path relative to the other, and a means for combining the transmission paths to a single output, wherein the first and second waveguide outputs of the waveguide router are coupled to the truncated Mach-Zehnder interferometer for altering the first waveguide output relative to the second waveguide output and for recombining the first and second waveguide outputs to produce the output signal having a predetermined wavelength $\lambda_i$, whereby light in the second order Brillouin zones is employed as an output from the waveguide router to enable high speed modulation of the wavelength $\lambda_i$ at the single output by selective activation of at least one of the series of amplifiers.

9. The transmitter of claim 8 having channel spacings of about from 0 GHz to 500 GHz.

10. The transmitter of claim 9 in which the waveguide grating router and the truncated Mach-Zehnder interferometer are monolithically integrated on a laser cavity.

11. An optical communications system comprising the transmitter of claim 10 mounted on an optical subassembly.

12. A method of modulating an optical signal generated by a laser, the method comprising the steps of:

providing a waveguide router for receiving an optical signal generated by the laser having a wavelength $\lambda_i$ and a phase, wherein the waveguide router splits the optical signal into first order and second order Brillouin zones and thereby produces a pair of waveguide outputs in the second order Brillouin zones having substantially the same phase;

coupling one of the pair of waveguide outputs to a first transmission path of a Mach-Zehnder interferometer and the other of the pair of waveguide outputs to a second transmission path of a Mach-Zehnder interferometer;

altering the phase of one transmission path relative to the other; and combining the first and second transmission paths to a single output signal so that the interference caused by combining the transmission paths having differing optical properties produces a modulated signal.

13. The method of claim 12, further providing the steps of:

coupling a plurality of amplifiers to the waveguide router and tuning the CW wavelength of the signal generated by the laser by selectively activating one or more of the plurality of amplifiers.

14. The method of claim 12, further providing the step of tuning the CW wavelength of the signal generated by the laser by altering the temperature of the device.

* * * * *